UNITED STATES PATENT OFFICE.

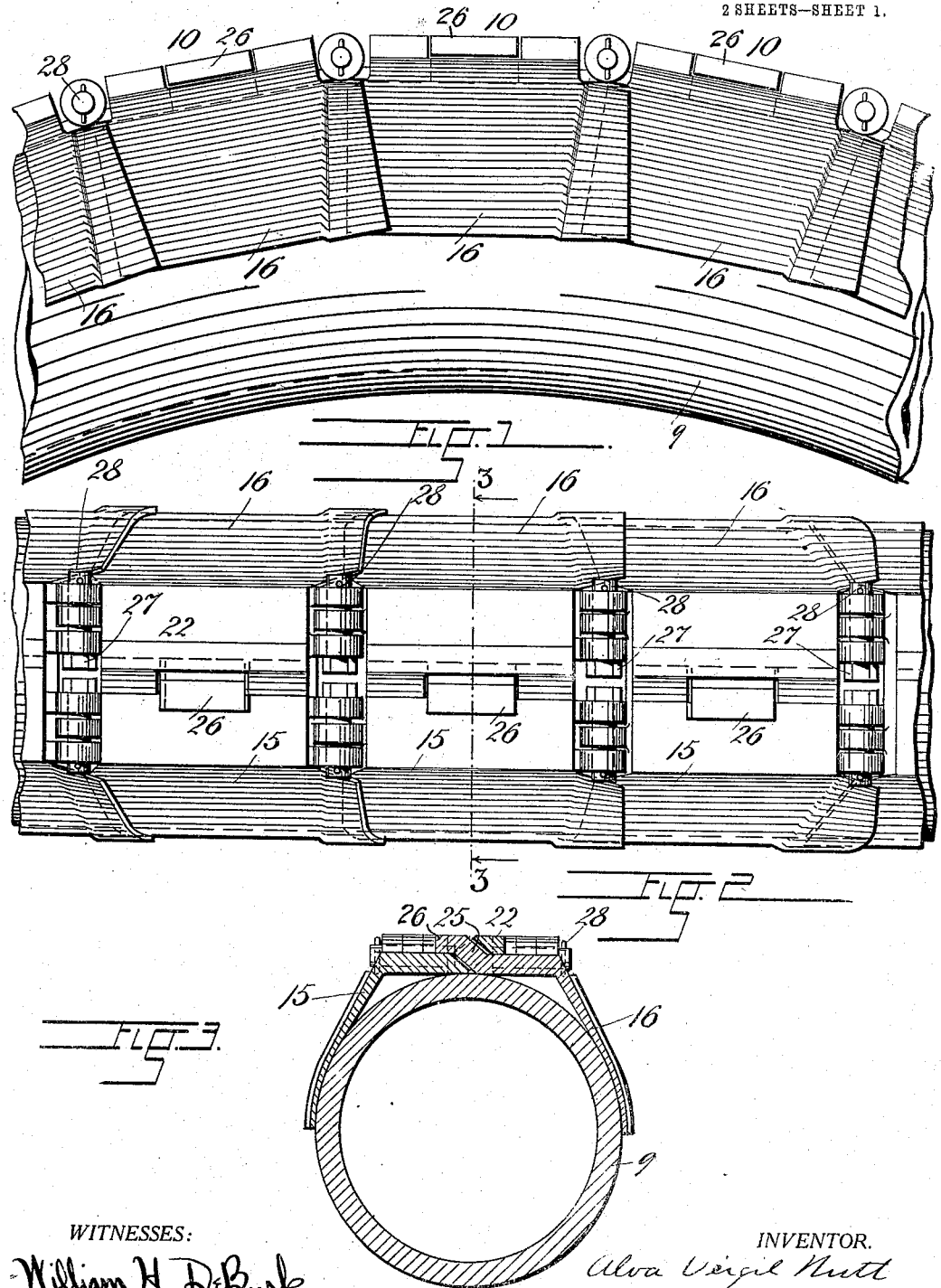

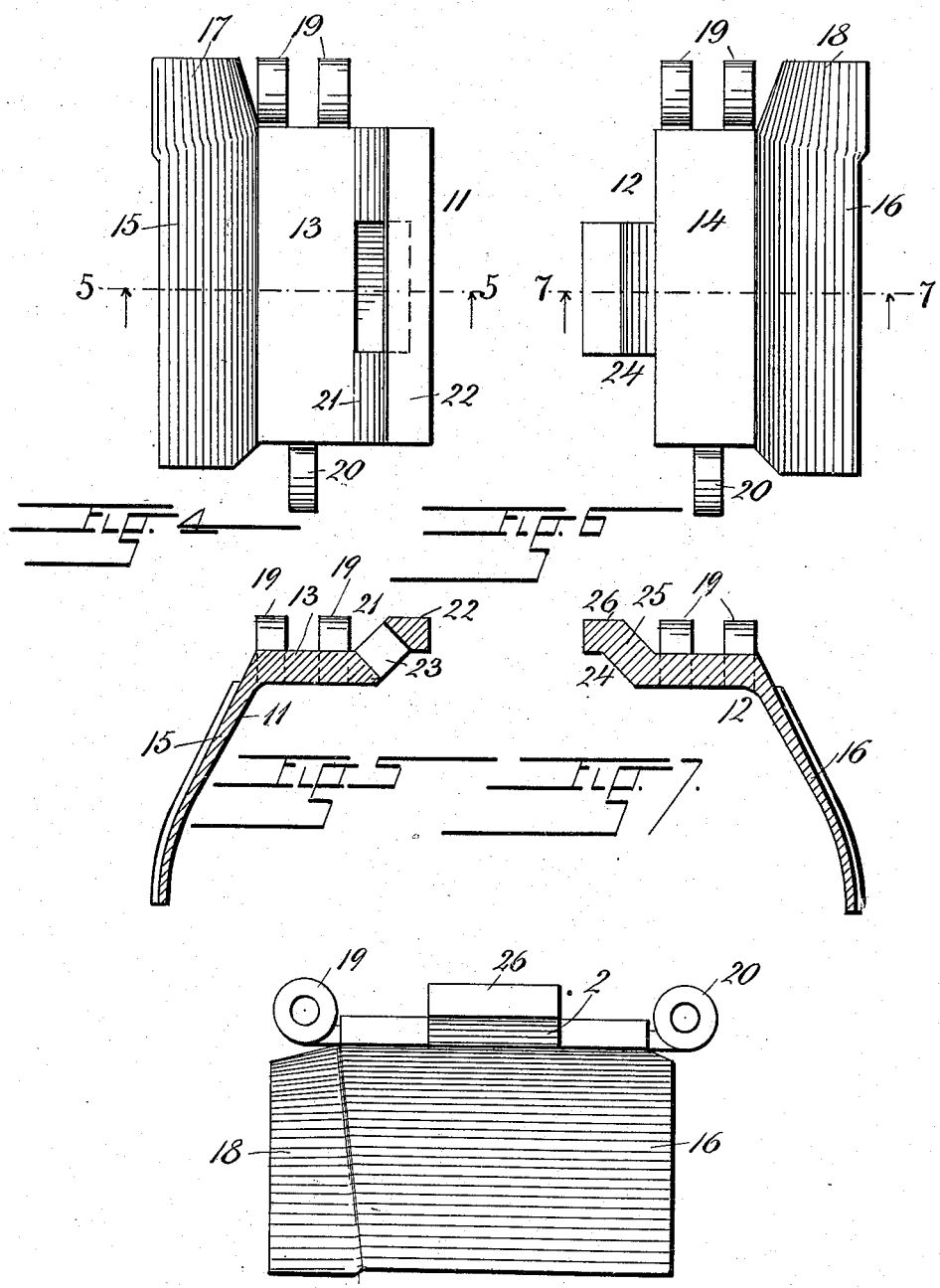

ALVA VIRGIL NUTT, OF DENVER, COLORADO.

TIRE-SHIELD.

No. 919,752.   Specification of Letters Patent.   Patented April 27, 1909.

Application filed September 25, 1907. Serial No. 394,539.

*To all whom it may concern:*

Be it known that I, ALVA VIRGIL NUTT, a citizen of the United States, residing in the city of Denver, county of Denver, State of Colorado, have invented certain new and useful Improvements in Tire-Shields, of which the following is a specification, reference being had to the accompanying drawings.

My invention relates generally to tires, and particularly to a shield or protector for automobile and similar tires, and its object is to provide a new and improved shield which will protect the tire from puncture, will give a firm and holding tread, will tend to prevent the wheels from slipping and sluing sidewise, and at the same time will be flexible so as to yield readily to the spring of the tire, permitting it to retain its original resiliency.

It has for its further object to improve the construction of tire shields in sundry details hereinafter pointed out.

To that end, my invention, generally speaking, consists in a series of sections made up of pairs of plates adapted to surround the tire circumferentially, flexibly connected with one another at the ends, the members of the section being so constructed that the sides will project down over a portion of the sides of the tire, and with the tops flexibly interlocked with one another.

I accomplish these objects by the means shown in the drawings and hereinafter specifically described.

That which I believe to be new will be pointed out in the claims.

In the accompanying drawings:—Figure 1 is a side elevation of a portion of a tire with my devices attached. Fig. 2 is a top or plan view of the same. Fig. 3 is a cross section on line 3 3 of Fig. 2. Fig. 4 is an enlarged detail, being a top view of one of the plates of which the sections are composed. Fig. 5 is an enlarged detail, being a cross section on the line 5 5 of Fig. 4. Fig. 6 is an enlarged detail, being a top or plan view of the other of said plates. Fig. 7 is an enlarged detail, being a section on line 7 7 of Fig. 6. Fig. 8 is an enlarged detail, being a side elevation of the plate shown in Fig. 6, viewed from within.

9 indicates a tire.

10 10 indicate a series of short sections which are adapted to surround the tire circumferentially. Each of these short sections is formed of two members 11 and 12, and each is composed of a flat top portion 13—14 and of a downwardly-projecting side portion 15—16 preferably formed integral therewith and projecting downward therefrom. One end of each of the side portions 15—16 is slightly flared outward at 17—18 in order to overlap the other end of the adjacent section, as is best shown in Figs. 1 and 2, and the side portions 15—16 project at each end beyond the flat top portions 13—14. Upon one end of each of the flat portions 13—14 are formed eyes 19. The eyes 19 are two in number upon each member, and are spaced apart to receive between them the eye 20, one of which is located upon the other end of each member of each section. The upper surface of the plate 11 is bent upward and then inward, forming a bevel portion 21 and a flat tread 22. The bevel portion 21 is of such a height as to bring the flat tread 22 about in the same plane with the upper surface of the eyes 19—20, as is best shown in Figs. 5 and 8.

23 indicates a slot which is cut through the bevel portion 21.

24 indicates a lug which is formed upon the upper surface of the plate 12. This lug 24 is bent into a bevel portion 25 and a flat portion 26, and is of a width to freely enter the slot 23 so as to interlock therewith, bringing the flat portion 25 and the tread 22 of the plate 11 on a level with each other, as is best shown in Fig. 3.

The members of the section are put together by inserting the tongue or lug 24 into the opening 23 in the position best shown in Fig. 3. The sections are then placed together around the tire, the flaring ends 17—18 overlapping the adjacent ends of the next sections, and with the eyes 20 coming between the eyes 19 of the adjacent sections, in which position they are locked together by pins 27 secured in place by split pins 28, or by bolts, or in any other appropriate manner. When the parts are thus in position, it will be obvious that the periphery of the tire and a portion of its sides are surrounded and protected by the sections; that the sections will yield inward a suitable amount in case the tire should drop into a rut, or for other reason, the connection of the lug 24 passing through the slot 23 permitting this but preventing the section members from separating in the other direction. By means of the pins passing through the screw-eyes, the connections between the sections are flexible, and the shield will therefore yield readily to any compression of the tire and consequent change of shape, and will preserve the original flexibility of the tire. It will also be obvious from the above description that the interlocking of the tongues and slots of each of the tire sections forms a hinge connection between said sections of such a character that the side members 16 of the said sections extending over the sides of the tire, may yield toward each other in response to any compression against them on the sides of the tire, but will resist by reason of the interlocking tongue and slot any tendency of the said side members to yield laterally away from the tire, thus tending to strengthen the tire and prevent bursting of the same by any undue pressure at any point from within said tire.

The flat portions 22 of the members 11, and the flat portion 26 of the lug 24 will form on the outer surface of each section a short flat tread which will help the wheel to engage the ground, and which, with the engagement with the ground by the other portions of the outer surface of the members, will tend to hold the tire to the road and prevent slipping or sluing.

What I claim as my invention and desire to secure by Letters Patent is:—

1. A tire shield, consisting of a plurality of sections pivotally linked at their adjacent ends, each section consisting of two members arranged side by side with their sides adapted to extend over the sides of the tire and interlocked at their tops to form a hinge permitting their sides to yield inwardly toward the tire but to resist movement of said sides away from each other and away from the tire, substantially as described.

2. A tire shield, consisting of a plurality of sections adapted each to overlap the next adjoining section at the end and pivotally linked at their adjoining ends, each section consisting of two members arranged side by side with side portions extending over the sides of the tire and tread portions, one of said tread portions being provided with a slot and the other with a tongue adapted to interlock with said slot and form a hinge adapted to permit said side portions to yield inwardly against the tire but to hold said side portions against moving outwardly from said tire.

3. The combination with a tire, of a plurality of pairs of plates extending circumferentially around the tire and having side portions extending over the sides of the tire and tread portions, tongue and slot connections adapted to interlock said parts at their tread portions to form a hinge connection between said pairs of plates adapted to permit the inward yielding of said side portions but resist outward yielding thereof, and means for pivotally connecting each plate of each pair at its ends with the adjacent plate, substantially as described.

ALVA VIRGIL NUTT.

Witnesses:
JOHN A. STEELE,
O. R. ARMSTRONG.